United States Patent Office 3,234,147
Patented Feb. 8, 1966

3,234,147
HARDENED MOLECULAR SIEVE AGGLOMER-
ATES AND MANUFACTURE THEREOF
Wilfred Drost, Williamsville, N.Y., and Elmer E. Dutch-
ess, Redondo Beach, Calif., assignors to Union Carbide
Corporation, a corporation of New York
No Drawing. Filed Sept. 25, 1961, Ser. No. 140,189
9 Claims. (Cl. 252—455)

This application is a continuation-in-part of application Serial No. 71,401, filed November 26, 1960, in the name of W. Drost and E. E. Dutchess, now abandoned.

This invention relates to hardened adsorbent agglomerates, and more particularly relates to hardened crystalline zeolitic molecular sieve adsorbent agglomerates and to methods for manufacturing such hardened agglomerates.

Crystalline zeolitic molecular sieve materials occur naturally or are synthesized as fine crystalline bodies which to be useful in large scale adsorptive or catalyst processes are made into agglomerates. One method of agglomerating these finely crystalline materials is by combining them with a clay binder as described and claimed in copending application Serial No. 620,177, now United States Patent No. 2,973,327, issued February 28, 1961, in the name of W. J. Mitchell et al. However, in certain fluid or moving-bed systems or fixed-bed systems the agglomerate is subjected to extremely high crushing loads either because of the bed height involved or because of higher process stream velocities engendering greater pressure drop in the bed. In addition it has been found that under some conditions, halogenated derivatives of ethane and methane employed as refrigerants are decomposed to some extent in the presence of zeolitic molecular sieve agglomerates used as desiccants for such refrigerants.

An object of this invention is to provide a method for improving the crush strength of molecular sieve agglomerates.

Another object is to provide a molecular sieve-clay mineral binder agglomerate having a higher crush strength than heretofore attained.

Still another object is to provide a molecular sieve-clay mineral binder agglomerate having high crush strength and high attrition resistance, thereby permitting its efficient use in moving-bed systems.

It is a further object to provide an agglomerate for use as a desiccant for refrigerant systems containing halogenated derivatives of ethane and/or methane, whereby decomposition of the halogenated hydrocarbons in such systems over extended periods of time is negligible and whereby the desiccant does not suffer any loss in crystallinity.

Additional objects and advantages of the invention will be apparent from the ensuing disclosure and the appended claims.

One aspect of the invention contemplates a method for hardening crystalline zeolitic molecular sieve agglomerates in which a hydrated agglomerate is provided consisting of the zeolitic molecular sieve and a clay mineral binder. An aqueous solution of an alkali metal silicate is provided having a solids content of between about 3% and 35% by weight. As used herein, the expression "solids content" refers to the sum of the weight percent of the alkali metal oxide and silicon dioxide.

The hydrated agglomerate and the aqueous solution are contacted for sufficient duration to impregnate the agglomerate with the alkali metal silicate. The impregnated agglomerate is separated from the aqueous solution and fired at temperatures of at least 650° F. and below that temperature at which the crystalline zeolitic molecular sieve is structurally unstable, so as to cure the silicate hardener.

In addition to improving the physical properties of agglomerated molecular sieve zeolites, it has been found that in some instances the selective adsorption characteristics of the molecular sieve are altered by the present invention to a degree that makes it more useful for certain uses. A specific instance is the use of sodium zeolite A as a desiccant for removing moisture from a refrigerant fluid such as monochlorodifluoromethane; the adsorptive capacity of the molecular sieve for the refrigerant fluid is reduced to substantially zero while the adsorptive capacity for water is substantially retained. The improvement in physical properties is also advantageous in refrigerant drying systems in that the tendency for the agglomerates to generate dust which may cause mechanical problems is reduced.

The term "zeolite," in general, refers to a group of naturally occurring and synthetic hydrated metal aluminosilicates, many of which are crystalline in structure.

There are, however, significant differences between the various synthetic and natural materials in chemical composition, physical properties and crystal structure, the latter as evidenced by X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalline zeolitic molecular sieve may be employed in the present method to provide a hardened zeolitic molecular sieve agglomerate according to the invention. The selection of the particular sieve will depend on factors such as the apparent pore size of the material, and the end use of the agglomerate. For example, the pores must be at least large enough to receive the desired adsorbate molecule. In the case of refrigerant drying, the pores are preferably less than about 4.9 Angstroms in diameter so as to permit the inclusion of the water molecules and exclude the larger halogenated hydrocarbon molecules. This latter aspect is discussed more fully hereinafter in relation to removal of moisture from halogenated methane and/or ethane-containing refrigerants.

Among the naturally occurring crystalline zeolitic molecular sieves are erionite, chabazite, analcite, faujasite, clinoptilolite and mordenite. The natural materials are adequately described in the chemical art. Synthetic zeolitic molecular sieves include zeolites A, T, X and Y.

Zeolite A is a crystalline zeolitic molecular sieve which may be represented by the formula:

$$1.0\pm0.2M_{2/n}O:Al_2O_3:1.85\pm0.5SiO_2:yH_2O$$

wherein "M" represents a metal, "$n$" is the valence of M, and "$y$" may have any value up to about 6. The as-synthesized zeolite A contains primarily sodium ions and is designated sodium zeolite A or zeolite 4A. Zeolite A is described in more detail in U.S. Patent No. 2,882,243, issued April 14, 1959.

Zeolite T is a synthetic crystalline zeolitic molecular sieve whose molar composition may be expressed in terms of oxides as follows:

$$1.1\pm0.4[xNa_2O,(1-x)K_2O]:Al_2O_3:6.9\pm0.5SiO_2:yH_2O$$

wherein "$x$" is any value from about 0.1 to about 0.8 and "$y$" is any value from about zero to about 8. Further characterization of zeolite T by means of X-ray diffraction techniques is described in U.S. Patent No. 2,950,952, issued August 30, 1960.

Zeolite X is a synthetic crystalline zeolitic molecular sieve which may be represented by the formula:

$$0.9\pm0.2M_{2/n}O:Al_2O_3:2.5\pm0.5SiO_2:yH_2O$$

wherein "M" represents a metal, particularly alkali and alkaline earth metals, "$n$" is the valence of "M," and "$y$" may have any value up to about 8 depending on the identity of "M" and the degree of hydration of the crystalline zeolite. Sodium zeolite X has an apparent pore size of about 10 Angstrom units. Zeolite X, its X-ray diffraction pattern, its properties, and method for its preparation are described in detail in U.S. Patent No. 2,882,244, issued April 14, 1959.

Zeolite Y is described and claimed in U.S. Patent application Serial No. 109,487, filed May 12, 1961, in the name of D. W. Breck.

The clay binder should be semi-plastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, palygorskite, kaolinite, plastic ball clays, clays of the attapulgite or kaolin types, bentonite, montmorillonite, illite, chlorite, and bentonite-type clay. Of these clays, the last five pass through an irreversible phase change above 700° C. which is above the temperature at which most molecular sieves lose their structural stability. Thus, if any of these five clays are to be used as a binder for such molecular sieves, the bonded product is only dried and activated rather than fired so as to effect the irreversible phase change in the clay.

The bonded molecular sieves are prepared by blending or mixing a binder and the sieve so as to form agglomerates. The agglomerates are in turn hardened by the setting of the binder. In a preferred practice the clay binder, molecular sieve and sufficient moisture to render the clay pliant are blended together. The mixture is extruded through a die, broken into small particles such as pellets and the binder hardened by drying.

The agglomerates, however prepared, are fired in a kiln at elevated temperatures. Both rotary and stationary furnaces have been found satisfactory for this firing step.

In a preferred embodiment, the crystalline zeolitic molecular sieve and the mineral clay binder are present in the agglomerate in a weight ratio range of about 9:1 to 3:1 (sieve to clay binder) on an essentially water-free basis. Furthermore, the material is preferably in its high-water content or "green" state, having not yet been fired to bind the agglomerate and activate the molecular sieve. The final firing effects the firing of the clay binder and the curing of the impregnated silicate.

Although a greater number of process steps is involved, molecular sieve-clay agglomerates which have already been fired can be hardened by silicate impregnation and final curing provided that they are restored to a fully hydrated state prior to impregnation. This is necessary because if the activated (dehydrated) agglomerates are contacted with liquid phase aqueous alkali metal silicate, weakening of the product or loss of desired size and shape of the already-formed agglomerate will result. Additionally, under these conditions many zeolitic molecular sieve species which are sensitive to hot alkalies will suffer loss of essential crystal structure to an undesirable extent.

Although sodium silicate is preferred as the hardening agent in the present invention, other alkali metal silicates such as the lithium, potassium, rubidium and cesium forms are also suitable. The use of potassium silicate for hardening the agglomerates containing particular species of zeolites has led to other surprising developments. For example, while zeolite A agglomerates hardened by use of a potassium silicate result in an agglomerate possessing hardness and attrition resistance similar to that resulting from the use of alkali metal silicates in general, the potassium silicate-containing agglomerate, in addition, possesses the ability to remove moisture from refrigeration systems with virtually no decomposition of the refrigerant while suffering no loss in the water adsorption capacity of the zeolitic molecular sieve portion of the agglomerate.

The alkali metal silicate solution may vary in its ratio of alkali metal oxide to silicon dioxide throughout the entire range of solubility. The presence of colloidal silica in suspension in the impregnating solution is not detrimental but has not been found to materially improve the product. Solutions containing alkali metal oxide to silicon dioxide ratios of 0.31 to 0.63 have been used with excellent results. When a somewhat higher ratio is used, the alkalinity may cause caustic attack of the crystal structure of the molecular sieve particularly at long impregnation contact times. Ratios lower than about 0.27 may be used but are not preferred because they tend to have increasing amounts of the silicon dioxide present in undissolved form.

The solid content of the silicate solution which is the sum of weight percent of the alkali metal oxide and the silicon dioxide in the solution may be from about 3 to about 35 weight percent. Lower than about 3% will not provide a sufficient introduction of silicate into the agglomerate to materially improve the crush strength, while more than about 35% leads to loss of adsorption capacity of the contained molecular sieve.

Within the above ranges of ratio of oxides and solid contents of the solution, the quantity of solution employed to impregnate a quantity of molecular sieve agglomerate may be in the range to provide 0.07 to 0.73 pound of solution solid per pound of agglomerate.

The contact or soaking of the agglomerates in the silicate solution may be either batch-type or continuous. When batchwise contact is employed it is desirable to provide agitation for uniformity. Such agitation may be conducted by stirring the solution with moderation, particularly when the agglomerates are in the unfired or "green" state to avoid breaking up the agglomerates.

Continuous contact is conveniently accomplished by percolating the solution through a chamber containing the agglomerates. In the continuous contact method the concentration of the solids in the silicate solution may be in the lower concentration range and the solution can be replenished as the solids are depleted.

The immersion may be hot or cold, the advantage of heat being that shorter contact time may be employed but the disadvantage is the faster rate of alkali attack on the crystal structure of the zeolitic molecular sieve. Temperatures below about 60° C. are to be preferred to reduce this attack particularly when the alkali metal oxide to silicon dioxide ratio is high.

The amount of silicate impregnated into the agglomerates is affected by all of the variables in the instant method and the time of contact. In some instances when using concentrated treating solutions, elevated temperatures, and very porous agglomerates, an immersion time of a few minutes is satisfactory. Longer contact times will generally result in an increase in the quantity of silicate entering the agglomerate and the distance of penetration of the silicate into the agglomerate. The time may extend to several hours or even several days, if desired, provided that the integrity of the agglomerate or the molecular sieve crystal is not affected. Increase in either or both the concentration and distance of the penetration will increase the final crush resistance of the product.

It is readily seen that by employing short immersion times in the practice of this invention, one can make a product having a hardened, abrasion-resistant exterior on the agglomerates which is entirely satisfactory for applications where this property is desired. On the other hand, longer contact times will effect a deeper hardening, which is preferred for maximum crushing resistance.

Following the immersion step the agglomerates are separated from the treating solution and may, if desired, be given a brief water rinse which will remove just enough of the solution adhering to the outer surface of the agglomerates to eliminate the tendency of the agglomerates to adhere to each other.

After the agglomerates have been separated from the impregnation solution they may be fired. However, it is preferred to give them an intermediate drying to reduce their moisture content to the range of 15 to 22 weight percent. This drying may for example be done by air-blowing and can be aided by moderate heating in the temperature range of 180° to 350° F. This drying serves to substantially remove the intracrystalline water thus reducing the heating load and steaming in the firing step.

The firing step completes the setting of the binder and at the same time removes the intracrystalline water of the crystalline molecular sieve, thereby activating it for adsorbent use. The firing may be done for example in a ventilated or forced-flow purge kiln to sweep out the evolved water vapor. The firing temperature required to set the binder is dependent upon whether or not the molecular sieve-clay mineral agglomerate was in its "green" or "fired" state prior to impregnation. When "green" agglomerates are being processed the temperature must be high enough to set the clay binder but below the temperature at which the crystal structure of the molecular sieve is destroyed. Temperatures in the range of 1050° to 1220° F. are preferred. When "fired" agglomerates are being processed, the temperature need be only high enough to set the silicate hardener. A temperature of at least 650° F. is required.

The invention is illustrated by the following examples:

EXAMPLE I

Spherical agglomerates, nominally ⅛" diameter, of 80 parts of sodium zeolite "A" crystalline molecular sieve and 20 parts of attapulgus clay mineral binder in the fully wet state as formed, were allowed to dry in air for 24 hours and then in an oven at 100° C. for 3 hours followed by firing at 625° C. for 15 minutes in a forced air-purge. The fired beads in the fired or activated state had a crush strength of 10.7±0.7 pounds. The crush strength after rehydration for 40 hours in air to moisture content of 17.0 weight percent was 9.1±1.7 pounds.

The equilibrium water capacity of the product at room temperature and 18 mm. pressure was 24.0 weight percent and the capacity for refrigerant difluoromonochloromethane at 50° C. and 700 mm. pressure was 6 weight percent.

The above example shows the representative strength of attapulgus-bonded molecular sieve beads without the silicate hardening treatment of the present invention.

EXAMPLE II

A one-pint bulk sample of the same batch of ⅛" diameter agglomerates in the wet condition as in Example I was placed in a quart jar. The jar was filled with a sodium silicate solution made up of 25 parts by volume of "BW" silicate solution and 75 parts by volume of water. "BW" silicate solution consists of 20% Na₂O and 31% SiO₂. The final solution thus contained 18 weight percent total solids and had a Na₂O to SiO₂ ratio of 0.63. The agglomerates were allowed to remain in this solution for 16 hours at room temperature and then were separated by draining the solution through a perforated jar top. The agglomerates were then rinsed by filling the quart jar about three-fourths full with water, inverting the jar twice, soaking for two minutes, then draining through a perforated cap. The impregnated agglomerates were then spread out in a drying pan and left in air under normal conditions for 24 hours. They were then further dried in an oven at 100° C. for 3 hours. The dried agglomerates were fired at 625° C. with an air purge to set the clay binder and silicate hardener and to activate the molecular sieve crystals. In the activated condition, the crush strength was 18.4±2.6 pounds. After rehydrating in air to a moisture content of 14.2 weight percent the crush strength was 14.9±3.4 pounds.

The equilibrium water capacity of the product measured at room temperature and 18 mm. Hg. water vapor pressure was 21.0 weight percent. Refrigerant difluoromonochloromethane was not adsorbed at 50° C. and 700 mm. Hg pressure.

EXAMPLE III

A one-pint quantity of the same lot of ⅛" diameter spherical agglomerates as used in Example I but in the fired state of the product of Example I were allowed to rehydrate overnight in a steam-heated circulating atmosphere oven. They were then placed in a quart jar and the jar filled with a sodium silicate solution of the same concentration as in Example II and allowed to soak for 7 hours. The solution was then drained off and the agglomerates rinsed as in Example II. They were dried in air for 40 hours and in an oven at 100° C. for 3 hours followed by firing at 625° C. in an air purge. The crushing strength of the fired product was 18.2±4.4 pounds and after rehydration was 13.2±4.1 pounds.

EXAMPLE IV

A one-third pint quantity of ⅛" spherical agglomerates of the same lot and in the same fired state as used in Example III were allowed to rehydrate in air for 48 hours and then immersed in plain water for 2 minutes. They were then soaked for 40 hours in a sodium silicate solution containing 12½ weight percent solids having a Na₂O to SiO₂ ratio of 0.31. The agglomerates were separated from the soaking solution, water-rinsed, air-dried for 24 hours, oven-dried at 100° C. for 2 hours and fired at 625° C. in an air purge. The fired product had a crushing strength of 22.3±2.7 pounds and after rehydration the strength was 18.4±2.2 pounds. No cracking of the pellets was observed.

Table I, below, shows the crush strength of silicate-hardened products compared to a non-silicate hardened product. These products were made using the same steps of soaking, drying and firing as in Examples II, III and IV with the composition of the silicate impregnating solutions varied as listed in the table. The drying times were varied somewhat, but this has not been found to be critical.

The hardness test consists of placing a single agglomerate pellet on a flat metal plate on a spring scale and adding weights to a plate arranged to rest on top of the pellet until it crushed. The crushing strength is an average for at least 25 pellets.

Table I
EFFECT OF VARYING THE COMPOSITION OF THE IMPREGNATING SOLUTION

| Expt. Group | Type of Silicate | $M_2O:SiO_2$ [a] | Lb. Silicate Solids Per Lb. Beads | Solid Content of Solution, Wt. Percent | Average Crush Strength, Lb. |
|---|---|---|---|---|---|
| A | | | | | 10.7 |
| B | Sodium | 0.63 | 0.07 | 18 | 17.4 |
| | do | 0.63 | 0.31 | 18 | 18.4 |
| | do | 0.63 | 0.73 | 18 | 20.6 |
| C | Sodium | 0.63 | 0.31 | 8 | 16.5 |
| | do | 0.63 | 0.31 | 18 | 18.4 |
| | do [b] | 0.63 | 0.31 | 32 | 29.2 |
| | do [b] | 0.63 | 0.31 | 42 | 32.5 |
| D | Sodium | 0.31 | 0.4 | 5 | 14.9 |
| | do | 0.31 | 0.4 | 12½ | 17.8 |
| | do | 0.31 | 0.4 | 18 | 19.8 |
| | do | 0.31 | 0.4 | 23 | 21.8 |
| | do [b] | 0.31 | 0.4 | 32 | 38.7 |
| E | Sodium | 0.35 | 0.4 | 6 | 14.8 |
| | do | 0.35 | 0.4 | 14 | 20.5 |
| | do | 0.35 | 0.4 | 24 | 27.2 |
| F | Potassium | 0.40 | 0.4 | 3 | 14.2 |
| | do | 0.40 | 0.4 | 15 | 20.2 |

[a] M denotes alkali metal.
[b] These products suffered considerable loss of water adsorptive capacity, though they are superior in their hardness.

Examination of the data in Table I reveals that the present invention provides a remarkable improvement in crush strength as compared to the non-hardened crystalline zeolitic molecular sieve agglomerates. The improvement varied from a minimum value 32.7% to a maximum value of about 262%. The table furthermore reveals that the crush strength increases with increasing weight ratios of silicate solids to molecular sieve agglomerate, and increasing solid contents in the aqueous solution.

Up to this point the discussion of the present process and product has been limited largely to a detailed analysis of two aspects of the invention; namely, the increase in crush resistance or hardness and the increase in resistance to attrition possessed by the agglomerates after treatment with alkali metal silicates. While this aspect of the invention is of major importance to the advantageous use of the product in adsorption separation systems in general, the processes and products of the present invention which utilize potassium silicate additives have also been found to possess particular advantages in the area of use as desiccants in systems such as refrigeration systems containing halogenated ethane and methane derivatives such as monochlorodifluoromethane, monochloropentafluoroethane, trichlorotrifluoroethane, dichlorotetrafluoroethane, tetrachlorodifluoroethane, dichloromonofluoromethane, tetrafluoromethane, dichlorodifluoromethane, monochlorotrifluromethane, trichloromonofluoromethane and methyl chloride.

In general, in halogenated hydrocarbon refrigerant systems it is necessary to utilize a molecular sieve agglomerate wherein the apparent pore size of the sieve is such that water is adsorbed in the cavities of the sieve while the refrigerant is excluded. Such systems are designed to operate over extended periods of time.

It has been found that when molecular sieves are used which have apparent pore sizes only slightly smaller than the refrigerant material being purified there is a small amount of decomposition of the refrigerant and loss in crystallinity of the molecular sieve which, though it may be of minor consequence over short periods of time, after extended periods may result in considerably more significant disadvantages. For example, in using sodium zeolite A for sustained periods in systems containing monochlorodifluoromethane it has been found that the monochlorodifluoromethane is decomposed and the molecular sieve loses its capacity to hold water to some extent. Sodium zeolite A is especially useful in these systems because of its characteristically high water capacity.

It should be noted that theoretically sodium zeolite A molecular sieve should not adsorb $CHF_2Cl$ on the basis of a comparison between the molecular size of the refrigerant and the apparent pore size of sodium zeolite A, but apparently some minute amount of this refrigerant finds its way into the inner adsorption area of the molecular sieve and after extended periods of operation the decomposition of the refrigerant and loss of the crystallinity of the molecular sieve do not permit optimum performance.

It has been unexpectedly discovered that in the use of a potassium silicate treatment for production of the herein described sodium zeolite A-containing agglomerates, decomposition of halogenated hydrocarbon refrigerants such as monochlorodifluoromethane in contact with the resulting agglomerate is markedly reduced and there is no loss in the water capacity of the molecular sieve. Yet with these new characteristics, the potassium silicate-containing product still possesses high crush resistance and very low attrition losses.

The process for treating the herein described sodium zeolite A molecular sieve agglomerates with potassium silicate can be conducted in substantially the same manner as disclosed for silicate treatment of any zeolite-clay agglomerate. For example, a ratio of potassium silicate to agglomerate of 0.4 (on a weight basis) has given quite satisfactory results. The potassium silicate is preferably utilized as a solution having a ratio of $K_2O/SiO_2$ of about 0.4 to 0.5 on a weight basis and having about an 18 percent solids content. A typical example of the process using potassium silicate is as follows:

One hundred fifty grams of wet spherical agglomerates of sodium zeolite A were soaked for six hours at room temperature in 400 grams of a potassium silicate solution containing 18% solids by weight. The ratio of potassium silicate to agglomerate on a weight basis was 0.7. The soaked agglomerates were separated from the solution by draining through a perforated jar top and were dried in an oven at 200° F. for one hour. The dried agglomerates were fired at 625° C. with an air purge to set the clay binder and silicate hardener and to activate the molecular sieve crystals. In the activated condition, the crush strength was 18.7 pounds. The equilibrium water capacity measured at room temperature and 18 mm. Hg pressure was 21.0 weight percent.

The following Tables II and III present data showing the effect of potassium silicate treatment of agglomerates containing sodium A zeolitic molecular sieves.

Table II shows the effect of potassium silicate treatment on the water and $CHF_2Cl$ capacity of the final agglomerate. Sample No. 1 is a standard agglomerate prepared from an admixture of a clay binder and a sodium zeolite A molecular sieve. Sample No. 1 did not receive a potassium silicate treatment. Samples No. 2–4 were treated for the times noted with a potassium silicate solution having a solids content of approximately 18 weight percent; the ratio of potassium silicate to agglomerate on a weight basis was 0.43.

Table II
WATER AND $CHClF_2$ CAPACITY OF AGGLOMERATES CONTAINING TYPE 4A MOLECULAR SIEVES AFTER TREATMENT WITH POTASSIUM SILICATE

| Sample No. | Potassium Silicate [a] Treatment Time, Quiescent, in hrs. | Crush Strength, pounds | $CHF_2Cl$ Capacity at 50° C., 700 mm. in 7 hrs. | $H_2O$ Capacity [b] | |
|---|---|---|---|---|---|
| | | | | Before $CHF_2Cl$ | After $CHF_2Cl$ |
| 1 | None | 18.5 | 13.4 | 25.5 | 20.3 |
| 2 | 4 | 29.3 | 0 | 20.5 | 20.0 |
| 3 | 7 | 26.1 | 0 | 20.8 | 20.3 |
| 4 | 23 | 28.9 | 0 | 19.6 | 19.6 |

[a] Potassium silicate solution containing 18 weight percent solids.
[b] After 18 hours.

From the data in Table II it is readily apparent that while the untreated agglomerates lose 20 to 25 percent of their capacity to adsorb water after seven hours' exposure to $CHClF_2$, the agglomerates treated with potassium silicate experience virtually no loss in their capacity to adsorb water after exposure to $CHClF_2$. These facts indicate that while there is considerable adsorption of $CHClF_2$ in the agglomerates which have not been treated with potassium silicate, agglomerates treated with potassium silicate experience virtually no $CHClF_2$ adsorption and consequently, as borne out in Table III, there is no concomitant decomposition of the halogenated methane and the crystallinity of the zeolitic molecular sieve has not been substantially affected. In addition the agglomerates possessed high crush strength after treatment with the potassium silicate additive. It should be noted that though the final water capacity of the treated and untreated agglomerates is appproximately the same for the period of the test, use of the untreated agglomerates for extended periods in halogenated methane and ethane derivative streams will deprive an artisan of the considerable advantages realized in the use of potassium silicate-treated agglomerates, namely; high crush strength, low attrition loss coupled with virtually complete stability in refrigerant drying applications over extended periods of time. Table II shows that after only 7 hours' contact with $CHF_2Cl$ the untreated Sample No. 1 lost about 20% of its ability to adsorb water. After considerably longer periods on the order of 4 to 6 weeks the untreated agglomerate would have lost at least half of its capacity to adbsorb $H_2O$.

Table III shows data obtained from studies of the extent of decomposition of $CHClF_2$, at intervals over a period of six weeks in contact with two representative agglomerates. Agglomerate No. 1 was not treated with alkali metal silicate while agglomerates No. 2 and No. 3 (two sizes of agglomerates) were treated for a period of 2 and 10 hours, respectively, with a solution of potassium silicate. The decomposition of $CHClF_2$ is indicated by measuring the amount of non-condensables, principally carbon monoxide, formed as a product of the decomposition of $CHClF_2$, utilizing a modification of the procedure described by Spauschus and Olsen (Refrigerating Engineering, February 1959, pp. 25–29).

Table III
DECOMPOSITION OF $CHClF_2$ IN CONTACT WITH AGGLOMERATES CONTAINING SODIUM ZEOLITE A MOLECULAR SIEVES AFTER TREATMENT WITH POTASSIUM SILICATE ADDITIVES

| Agglomerate No. | Total CO Formation, cc./gm. of agglomerate | | | |
|---|---|---|---|---|
| | 1 week | 2 weeks | 4 weeks | 6 weeks |
| 1 | 2.9 | 3.6 | 4.8 | |
| 2 | 0.03 | 0.05 | 0.08 | 0.17 |
| 3 | 0.02 | 0.02 | 0.09 | 0.14 |

The results given in Table III show an approximately thirty-sixfold decrease in $CHClF_2$ decomposition after six weeks when potassium silicate is utilized as an additive in the agglomerates.

The chloride taken up by the desiccants was measured after the desiccants and refrigerant had been in contact for four and six weeks, as shown below.

| | Chloride Found, grams/ gram of desiccant | |
|---|---|---|
| Contact, Weeks | 4 | 6 |
| Potassium silicate treated 4A | | 0.001 |
| Untreated 4A | 0.012 | |

The superiority of the potassium silicate treated product over the untreated product with respect to the greater chemical stability of the systems in which it is used is clearly shown by the data hereinabove.

Although preferred embodiments of the invention have been described in detail, it is contemplated that modifications of the method and composition of matter may be made and that some features may be employed without others, all within the spirit and scope of the invention.

What is claimed is:

1. A method for hardening crystalline zeolitic molecular sieve agglomerates comprising the steps of providing a hydrated agglomerate of said zeolitic molecular sieve and a clay mineral binder; providing an aqueous solution of an alkali metal silicate having a solids content of between about 3% and 35% by weight; contacting said hydrated agglomerate and said aqueous solution for sufficient duration to impregnate such agglomerate with said alkali metal silicate; separating the impregnated agglomerate from the solution; and firing the impregnated agglomerate at temperatures of at least 650° F. and below that temperature at which said crystalline zeolitic molecular sieve is structurally unstable so as to cure the silicate hardener.

2. A method according to claim 1 in which sodium zeolite A is said zeolitic molecular sieve.

3. A method according to claim 1 in which the quantity of said aqueous solution contacted with said hydrated agglomerate is sufficient to provide about 0.07 to 0.73 pound solid content per pound of dry agglomerate.

4. A method according to claim 1 in which said hydrated agglomerate and aqueous solution are contacted at temperatures below about 60° C.

5. A method according to claim 1 in which the separated impregnated agglomerate is dried at temperatures of 180° to 350° F. prior to said firing.

6. A method according to claim 1 in which the weight ratio of alkali metal oxide to silicon dioxide in said aqueous solution is between about 0.31 and 0.63.

7. A method according to claim 1 in which said impregnated agglomerate is fired at temperatures between about 1050° and 1220° F. to simultaneously activate said zeolitic molecular sieve and cure the silicate hardener.

8. A method according to claim 1 in which the alkali metal silicate is potassium silicate, the weight ratio of said zeolitic molecular sieve to said clay mineral binder is between about 9:1 and 3:1, and said impregnated agglomerate is fired at temperatures between about 1050° and 1220° F. to simultaneously activate said sodium zeolite A molecular sieve and cure the alkali metal silicate hardener.

9. A composition of matter comprising an agglomerate of crystalline sodium zeolite A molecular sieve and a clay mineral binder, having impregnated therein as a hardener cured akali metal silicate, said composition being prepared by the process of claim 1.

(References on following page)

References Cited by the Examiner

UNITED STATES PATENTS

| | | | |
|---|---|---|---|
| 2,017,428 | 10/1935 | Almquist | 252—455 X |
| 2,063,302 | 12/1936 | Eversole | 252—470 |
| 2,292,632 | 8/1942 | Greger | 252—455 |
| 2,530,129 | 11/1950 | McAteer et al. | 55—35 |
| 2,865,867 | 12/1958 | Van Dyke et al. | 252—455 |
| 2,882,243 | 4/1959 | Milton | 23—113 |
| 2,973,327 | 2/1961 | Mitchell et al. | 252—449 |
| 3,013,987 | 12/1961 | Castor et al. | 252—455 |
| 3,039,953 | 6/1962 | Eng | 252—455 |
| 3,055,841 | 9/1962 | Gladrow et al. | 252—455 |
| 3,078,635 | 2/1963 | Milton | 55—35 |

MAURICE A. BRINDISI, *Primary Examiner.*